United States Patent
Lemke et al.

(12) 
(10) Patent No.: US 6,318,232 B1
(45) Date of Patent: Nov. 20, 2001

(54) PRESSURE-CUTOFF ARRANGEMENT FOR AN AUXILIARY POWER STEERING SYSTEM IN THE END POSITIONS OF THE STEERING LOCK

(75) Inventors: Norbert Lemke, Ludwigsburg; Markus Gutzlaff, Hochberg, both of (DE)

(73) Assignee: Mercedes Benz Lenkungen GmbH (DE)

( * ) Notice: Subject to any disclaimer, the term of this patent is extended or adjusted under 35 U.S.C. 154(b) by 0 days.

(21) Appl. No.: 09/568,725

(22) Filed: May 11, 2000

(30) Foreign Application Priority Data

May 11, 1999 (DE) .............................................. 199 21 553

(51) Int. Cl.⁷ ...................................................... F15B 9/10
(52) U.S. Cl. .......................................... 91/375 A; 91/399
(58) Field of Search ................... 91/399, 375 R, 91/375 A

(56) References Cited

U.S. PATENT DOCUMENTS

| 4,625,624 | * | 12/1986 | Adams | 91/375 A |
| 5,419,235 | * | 5/1995 | Gilbert et al. | 91/375 A |
| 5,803,201 | * | 9/1998 | Sheppard | 91/375 A |

FOREIGN PATENT DOCUMENTS

| 41 27 610 A1 | 2/1992 | (DE) . |
| 195 06 995 A1 | 8/1995 | (DE) . |
| 0 321 756 A2 | 12/1988 | (EP) . |
| P 9202046 | 10/1992 | (ES) . |

\* cited by examiner

Primary Examiner—Edward K. Look
Assistant Examiner—Igor Kershteyn
(74) Attorney, Agent, or Firm—Woodbridge & Associates, P.C.; Richard C. Woodbridge

(57) ABSTRACT

The invention relates to a pressure-cutoff arrangement for an auxiliary power steering system in the end positions of the steering lock, having at least one working poston 2 which is displaceable in the axial direction in a steering housing 1 and delimits two working spaces I, II, cutoff valves 7, 17 associated with the working piston 2, and also stop elements 13, 23 which are associated with the steering housing 1 and are displaceable in the axial direction and against which one of the cutoff valves 7, 17 runs, in each case, in the end position and, in doing so, opens for the purpose of cutting off the pressure, and wherein the stop elements 13, 23 are fixed in a force-locking manner, with a retaining force which exceeds the opening force of the cutoff valves 7, 17, a spring 14, 24 acting in the radial direction.

7 Claims, 4 Drawing Sheets

PRESSURE-CUTOFF ARRANGEMENT FOR AN AUXILIARY POWER STEERING SYSTEM IN THE END POSITIONS OF THE STEERING LOCK

CROSS REFERENCE TO RELATED APPLICATIONS

This application claims the priority of German application number 19921552.7 filed Nov. 5, 1999.

BACKGROUND OF THE INVENTION

1. Field of the Invention

The invention relates to a pressure-cutoff arrangement for an auxiliary power steering system in the end positions of the steering lock.

2. Description of Related Art

Pressure-cutoff arrangements of this type are known from the prior art. Thus, for example, EP 0321756 A2 indicates a recirculating ball steering system in which the working piston carries two seat valves which can be actuated in the axial direction and which strike against the housing in the end positions of the admissible steering lock and, in doing so, reduce the working pressure occurring in the working space which has been acted upon by pressure. As a result of this, the auxiliary power assistance is eliminated when this impingement occurs, so that further turning of the steering system is not possible.

A generic auxiliary power steering system, in which cutoff valves are likewise associated with the working piston, is also known from Spanish Patent Application P9202046. In the extreme positions, the cutoff valves impinge on a stop in the form of a pin which is pretensioned in the direction of the valves by a spring. The pin can be locked in the radial direction with the aid of a clamping screw. In order to set the opening point of the cutoff valves, and thereby set the stop limits, it is necessary, in this steering system, to undo the clamping screw and to actuate the steering system manually, with the wheels relieved of load, until the maximum admissible turning angle is reached. As a result of this, the cutoff valve will press the spring-loaded pin inwards into the required position. The pin can then be locked in this position and is thereby permanently set.

Finally, the nearest prior art is known from DE 4127610, in which stop means in the form of a bolt or bush form the end stops of the cutoff valves. The pistons or bushes are seated, with a press fit, on ribs constructed in the peripheral direction and can be pressed, when the front wheels are relieved of load for the purpose of setting the steering system manually, that is to say without auxiliary power assistance, into the required position, in which they are fixed automatically because of the press fit. In this form of embodiment, manual fixing, such as is known from Spanish Patent Application P9202046, is not necessary. However, the press fit of the piston or bush on the one hand necessitates very precise manufacture of the corresponding structural elements, and on the other hand permits, at most, very few repeated setting operations, since the fit becomes loose in the event of repeated changing and the retaining force falls below the opening force of the cutoff valve.

SUMMARY OF THE INVENTION

The object of the present invention is therefore to provide a pressure-cutoff device for an auxiliary power steering system, which device is capable of repeated setting and sets itself by simple manual turning of the steering system.

Because the stop means are fixed by means of a spring which acts in the radial direction and has a retaining force that exceeds the opening force of the cutoff valves, they can be brought to the required setting by manually moving the cutoff valves against the stop means. Even repeated displacement of the stop means does not lead to a substantial drop in the retaining force of the radial spring. In this connection, it is advantageous if the stop means has a substantially round shaft region and the spring surrounds the said shaft region in the form of a ring. In addition to satisfactory retaining force, this also brings about a distribution of the said retaining force which is uniform over the periphery, and also a certain guidance of the stop means. If the spring is a circumferential coil spring with a wave-like profile in the peripheral direction, particularly high retaining force can be achieved with simultaneous centring of the stop means.

For simple resetting of the stop means, it is advantageous if the latter are guided, in each case, in a bore, for example a through-bore in the steering housing or else a bore in a separate holder, each through-bore preferably having a removable fluid-tight and pressure-tight closure, after the removal of which, one end of the particular stop means, which end faces away from the steering housing, is accessible from outside. The stop means can then be moved manually into a basic position from which setting takes place.

Finally, it is advantageous, for reliable and mechanically stable mounting, if the spring is enclosed in an annular groove associated with the through-bore or with the shaft region, and is fixed in the axial direction. The spring is then fixed either in the steering housing or on the stop means and can be easily brought into this defined position on assembly.

BRIEF DESCRIPTION OF THE DRAWINGS

An exemplified embodiment of the present invention will be described below with the aid of the drawings, in which.

DETAILED DESCRIPTION OF THE INVENTION

Figure 1:
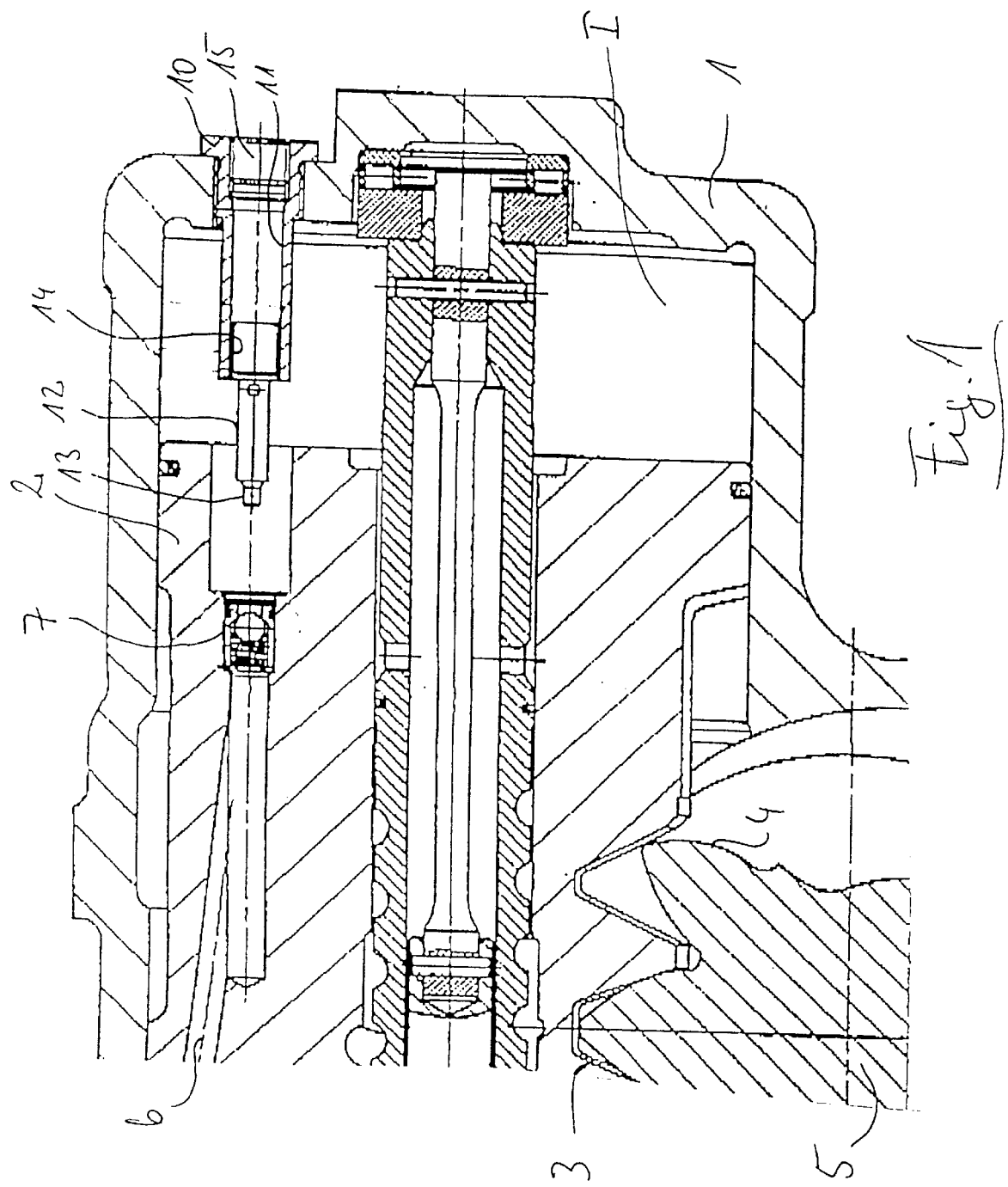
FIG. 1: shows a cross-section through a recirculating ball steering system in the region of a cutoff valve, with the stop means in the basic position.

FIG. 1 shows a detail from a recirculating ball steering system, in cross-section. Represented in this figure is a steering housing 1 which contains a working piston 2 and guides it in the axial direction and which delimits, with the said piston, a first working space I. The working piston 2 carries a toothing system 3 which meshes with a corresponding pinion 4 on a steering shaft 5. The working piston 2 also carries a duct 6 with cutoff valves 7. A hollow screw 10 with an internal through-bore 11 is also disposed in the wall of the steering housing 1 in a manner aligning with the cutoff valve 7 in the axial direction. A stop bolt 12 which carries, facing the cutoff valve 7, a point 13 and, facing the hollow screw 10, a radial spring 14, is guided in the axial direction in the through-bore 11. On the outside of the housing, the bore 11 in the hollow screw 10 is closed in a liquid-tight and pressure-tight manner with the aid of a screwed plug 15. In the representation according to FIG. 1, the stop bolt 12 is located in its left-hand extreme position. The equalisation of pressure between the working space I and the bore 11 in the interior of the hollow screw 10 is guaranteed by a relieving bore or groove, of which no further details are represented.

Figure 2:
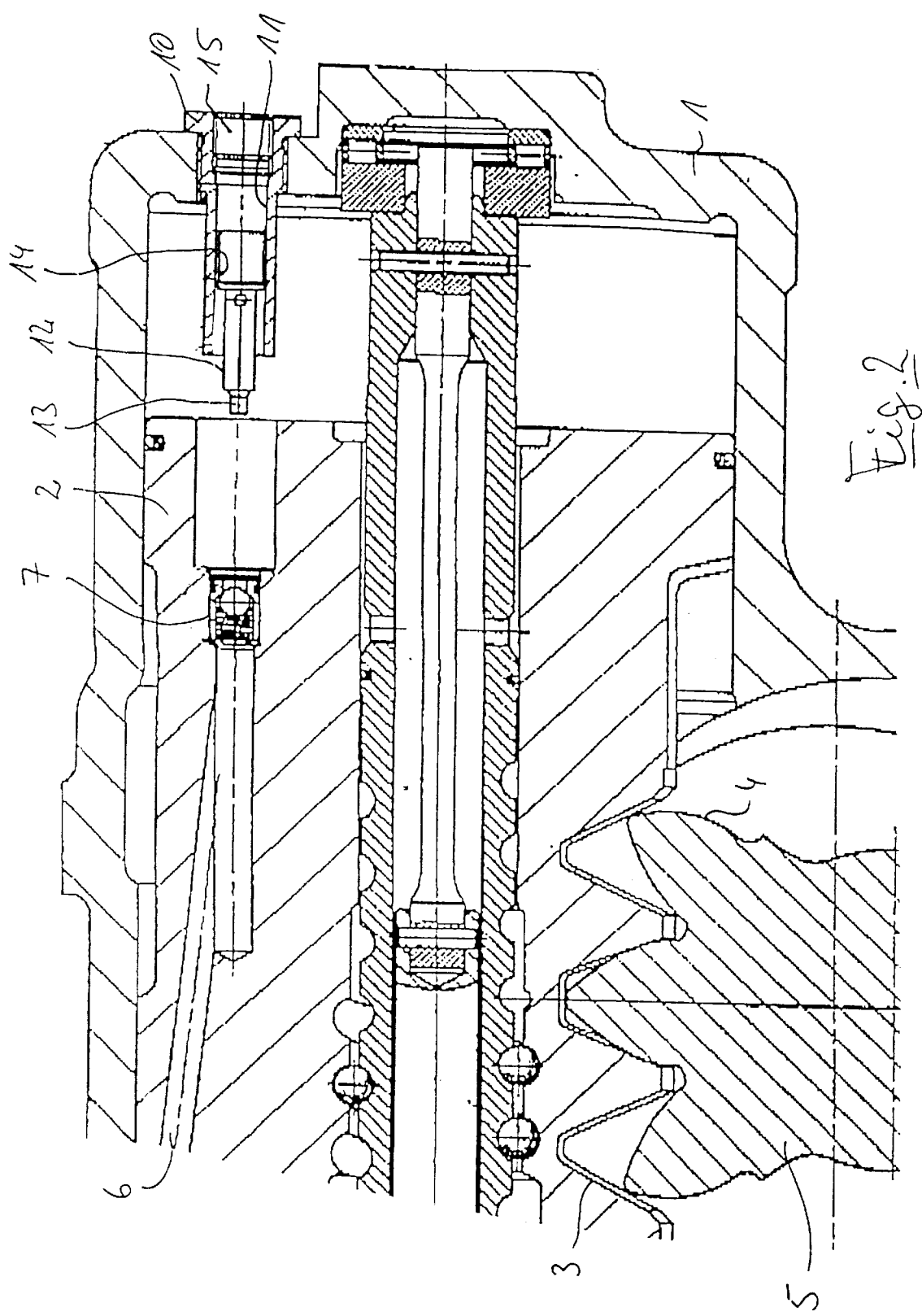
FIG. 2: shows the cross-section according to FIG. 1, with the stop means set.

The steering system according to FIG. 1 is represented in FIG. 2, identical features bearing the same reference numerals. What is illustrated in the region of the hollow screw 10 is the fact that the axially displaceable stop bolt 12 is displaced at this point, for the purpose of setting an end stop, into a central position inside the bore 11 in the hollow screw 10.

Figure 3:
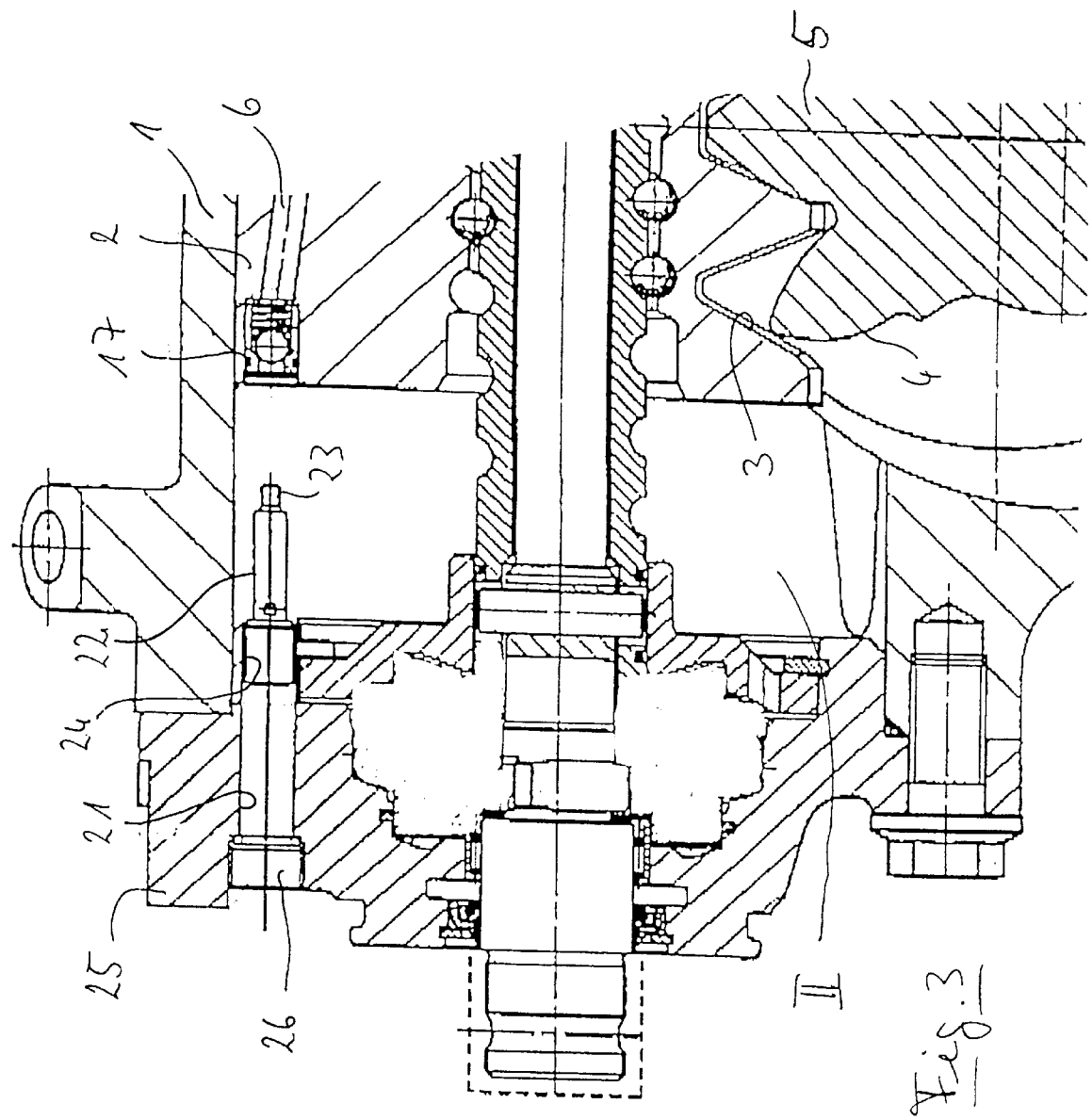
FIG. 3: shows a cross-section through the steering system according to FIG. 1, in the region of the second stop means.

The region of the steering system according to FIGS. 1 and 2 which faces towards the steering column is represented in FIG. 3. Once again, identical features bear the same reference numerals. Here, the housing 1 and the working piston 2 delimit a second working space II. In this case, the end of the duct 6 which is on this side carries a second cutoff valve 17 which is disposed in a manner aligning axially with a second through-bore 21 and also with a stop bolt 22 mounted therein. The stop bolt 22 10 carries a point 23 facing towards the valve 17, and is mounted in the through-bore 21 by means of a radial spring 24. Here, the through-bore 21 is incorporated directly in a valve housing 25 and closed in a fluid-tight and pressure-tight manner by a screw closure 26. Under these circumstances, the closure 26 can be designed so as to be structurally identical to the closure 15 of the hollow screw 10.

Figure 4:
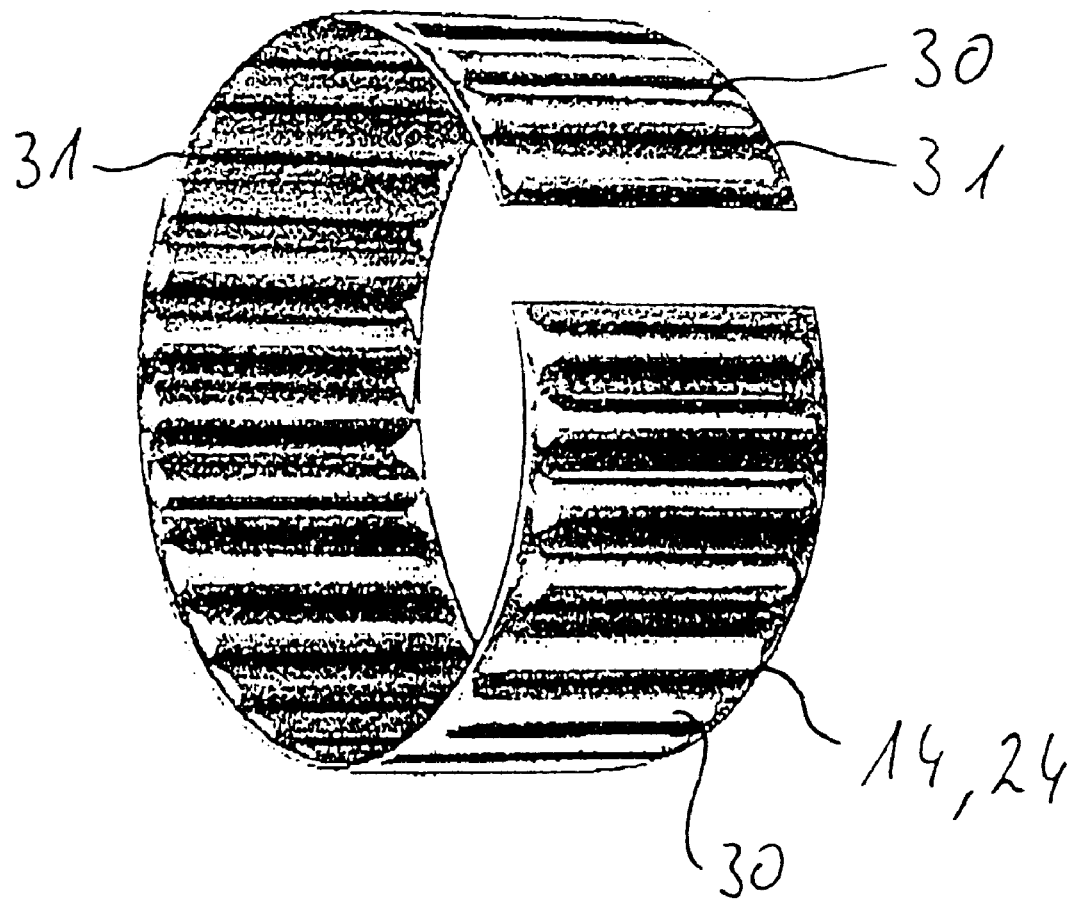
FIG. 4: shows a radial spring in a perspective view.

Finally, FIG. 4 shows a radial spring 14, 24 in a perspective representation. It can be seen that the radial spring is an annular coil spring which is open on one side and has a circumferential, wave-like structure 30. In this exemplified embodiment, the wave-like structure is stamped out in a trapezoidal manner, a marginal region 31 of the radial spring 14, 24 being devoid of the profile.

In practice, the steering system so far described works as follows:

In order to bring about rotation of the steering shaft 5 in the clockwise direction, the working space II is acted upon by pressure. Under these circumstances, the working piston 2 is forced towards the right in the representation in FIGS. 1 to 3. The fluid pressure occurring in the working space II opens the spring-loaded one-way valve 17, so that the same pressure essentially occurs in the duct 6 as in the said working space II. The one-way valve 7 is acted upon in its closing direction by the said pressure, so that no drop in pressure takes place at the valve 7 and the fluid pressure occurring in the working space II is maintained. As soon as the working piston 2 has moved towards the right sufficiently far for the valve 7 to come into contact with the point 13 of the stop bolt 12, the said valve 7 is opened. The pressure occurring in the working space II is then able to equalise with that in the working space I, so that the auxiliary power assistance ceases because of the balanced pressure conditions in the two working spaces II, I. The manually applied actuating force is then smaller than the minimum force required for further axial movement of the working piston. The steering system is thus blocked in this direction of rotation. The same applies, in a corresponding manner, to rotation of the steering shaft 5 in the anticlockwise direction, under which circumstances the working space I is acted upon by pressure, the working piston 2 moves towards the left and the fluid pressure passes through the valve 7, which opens in this direction, and the duct 6 until it reaches the valve 17. In the left-hand extreme position, in which the point 23 of the stop bolt 22 impinges on the valve 17, the said valve 17 is opened again so that the fluid pressure in the working spaces I and II is able to equalise except for a small residual pressure difference. The servo assistance likewise essentially ceases. The position of the stop bolts 12, 22 and, in particular, of the points 13, 23 in the bores 11, 21 is therefore decisive as regards the maximum available working traverse of the working piston 2 and therefore as regards the maximum pivoting angle of the steering shaft 5.

Since, in this case, only the servo assistance is eliminated as a result of a high degree of pressure equalisation in the working spaces I and II, the working piston 2 can be moved manually onwards in the axial direction onto the stop when the load on the steered axle of the motor vehicle is relieved. A small residual pressure of 20 to 40 bar assists this movement, but is insignificant when the axle is loaded. In this way, the stop bolt 12, 22 comes into mechanical contact with the base member of the valve 7, 17 and this pushes the stop bolt 12, 22 into the bore 11, 21.

In this process, the retaining force inside the bore 11, 21, which is applied by the radial pretensioning of the radial spring 15, 24, is overcome. This operation serves to preset the point at which the servo assistance is to actually cease under running conditions as a result of the opening of the valves 7, 17, that is to say, serves to set the end stops of the steering system which are operative under running conditions. In many cases, these end stops can only be set in the motor vehicle itself, since the circumstances of installation and, if applicable, the tyres, make individual setting necessary.

Should setting be carried out once more, for example in the event of a change in the tyres on the steered axle or of modified bodywork superstructures or extensions, it is merely necessary, in the exemplified embodiment so far described, to screw out the threaded closures 15, 26 so that the stop bolt 12, 22 can be driven into its inner basic position (illustrated in FIGS. 1 and 3) again from the outside with the aid of a gauge or tool. A renewed setting operation is then possible, in which the steered axle is relieved of load and the steering system can be turned, without servo assistance, as far as the new admissible stops that are to be established. In this process, the stop bolts 12, 24 are pressed into the bores 11, 21 once more, where they are again locked by the retaining force of the radial springs 14, 24. In the case of the subject of the present invention, this operation is repeatedly possible without any substantial decline in the retaining force of the radial springs 14, 24. Apart from relieving the load on the steered axle of the vehicle, no further tampering with the steering system is necessary for actually setting the end stops. In the solutions known from the prior art it was necessary, in this operation, either to fix, by jamming the stop bolt, the stop that had been found, or else a press fit, which could be reliably adjusted only once or, at most, a few times, was chosen for the stop bolt. In the event of frequent adjustment, the retaining force of the press fit declines to an undesired extent.

Tolerance rings or radial shaft rings, which are commercially available and usually serve for producing a shaft-to-hub connection, are particularly suitable as radial springs. Tolerance rings of this kind can be obtained, for example, from the company Rencol Tolerance Rings Ltd., of Great Britain.

What is claimed is:

1. Pressure-cutoff arrangement for an auxiliary power steering system in the end positions of the steering lock, wherein the auxiliary power steering system has at least one working piston (2) which is displaceable in the axial direction in a steering housing (1) and delimits two working spaces (I, II), cutoff valves (7, 17) associated with the said working piston (2), and also stop means (13, 23) which are associated with the steering housing (1) and are displaceable in the axial direction and against which one of the cutoff valves (7, 17) runs, in each case, in the end position and, in doing so, opens for the purpose of cutting off the pressure, characterised in that the stop means (13, 23) are fixed in a force-locking manner, with a retaining force which exceeds an opening force of the cutoff valves (7, 17), by means of a spring (14, 24) acting in the radial direction.

2. Device according to claim 1, characterised in that the stop means (13, 23) has an essentially round shaft region, and that the spring (14, 24) surrounds the said shaft region in the form of a ring.

3. Device according to claim 1, characterised in that the spring (14, 24) is a circumferential coil spring with a wave-like profile (30) in the peripheral direction.

4. Device according claim 1, characterised in that the stop means (13, 23) are guided, in each case, in a bore (11, 21), each bore (11, 21) having a removable fluid-tight and pressure-tight closure (15, 26), after the removal of which, one end of the particular stop means (13, 23), which end faces away from the working piston (2) of the steering housing (1), is accessible.

5. Device according to claim 4, characterised in that the bore (21) is a through-bore in the steering housing (1).

6. Device according to claim 4, characterised in that the bore (11) is a blind bore or a through-bore in a hollow screw, which is to be fastened separately in the steering housing (1).

7. Device according to claim 1, characterised in that the spring (14, 24) is enclosed, and fixed in the axial direction, in an annular groove associated with the bore (11, 21) or a shaft region.

* * * * *